United States Patent
Chiang-Lin

(10) Patent No.: US 8,238,668 B2
(45) Date of Patent: Aug. 7, 2012

(54) METHOD FOR CONTROLLING ELECTRONIC DEVICE AND ELECTRONIC DEVICE THEREOF

(75) Inventor: Yi-Ta Chiang-Lin, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 1153 days.

(21) Appl. No.: 12/101,509

(22) Filed: Apr. 11, 2008

(65) Prior Publication Data
US 2009/0060350 A1   Mar. 5, 2009

(30) Foreign Application Priority Data
Aug. 28, 2007   (CN) .......................... 2007 1 0201505

(51) Int. Cl.
*G06K 9/68* (2006.01)
(52) U.S. Cl. ......... 382/218; 382/100; 382/181; 382/190
(58) Field of Classification Search ................. 382/100, 382/209, 218; 348/143
See application file for complete search history.

(56) References Cited

U.S. PATENT DOCUMENTS

| | | | | |
|---|---|---|---|---|
| 6,115,482 | A  * | 9/2000 | Sears et al. | 382/114 |
| 6,295,464 | B1 * | 9/2001 | Metaxas | 600/407 |
| 6,421,453 | B1 * | 7/2002 | Kanevsky et al. | 382/115 |
| 8,064,704 | B2 * | 11/2011 | Kim et al. | 382/190 |
| 2002/0057383 | A1 * | 5/2002 | Iwamura | 348/734 |
| 2003/0071908 | A1 | 4/2003 | Sannoh et al. | |
| 2004/0196400 | A1 | 10/2004 | Stavely et al. | |
| 2006/0136846 | A1 * | 6/2006 | Im et al. | 715/863 |
| 2009/0074300 | A1 * | 3/2009 | Hull et al. | 382/209 |

FOREIGN PATENT DOCUMENTS

| | | |
|---|---|---|
| CN | 1459073 A | 11/2003 |
| TW | 200816798 | 4/2008 |

* cited by examiner

*Primary Examiner* — Stephen R Koziol
(74) *Attorney, Agent, or Firm* — Altis Law Group, Inc.

(57) ABSTRACT

An object is held in any one of a plurality of specific orientations to present an aspect, corresponding to a specific orientation, to an imaging module of an electronic device. An image of the aspect is captured. The current captured image is compared with images in a library of image-command associations to find a match. If a match is found, the electronic device triggers a command execution of the matching image-command association. If no match is found, a new image-command association is established and stored in the library of the image-command associations.

16 Claims, 3 Drawing Sheets

A first aspect

A second aspect

A third aspect

METHOD FOR CONTROLLING ELECTRONIC DEVICE AND ELECTRONIC DEVICE THEREOF

BACKGROUND

1. Field of the Invention

The present invention relates to remote control methods and, particularly, to a method for controlling an electronic device and the electronic device thereof.

2. Description of the Related Art

The remote control is a convenient method for controlling electronic devices and is in widespread use. Typically, in order to realize remote control, a frequency-based or infrared-based wireless transmitter and receiver are used. In particular, the wireless transmitter is packed as a portable remote control for sending control signals, and the wireless receiver is integrated into the electronic device for receiving the control signals to control the electronic device to perform corresponding functions. However, remote controls are easily misplaced, and it is time-consuming to find them when this happens.

Therefore, it is desirable to provide a method for controlling an electronic device and the electronic device, which can overcome the above mentioned problem.

SUMMARY

An object is held in any one of a plurality of specific orientations to present an aspect, corresponding to a specific orientation, to an imaging module of an electronic device. An image of the aspect is captured. The current captured image is compared with images in a library of image-command associations to find a match. If a match is found, the electronic device triggers a command execution of the matching image-command association. If no match is found, a new image-command association is established and stored in the library of the image-command associations.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION OF THE EMBODIMENTS

Embodiments of the present electronic device and method will be described in detail below with reference to the drawings.

Figure 1:
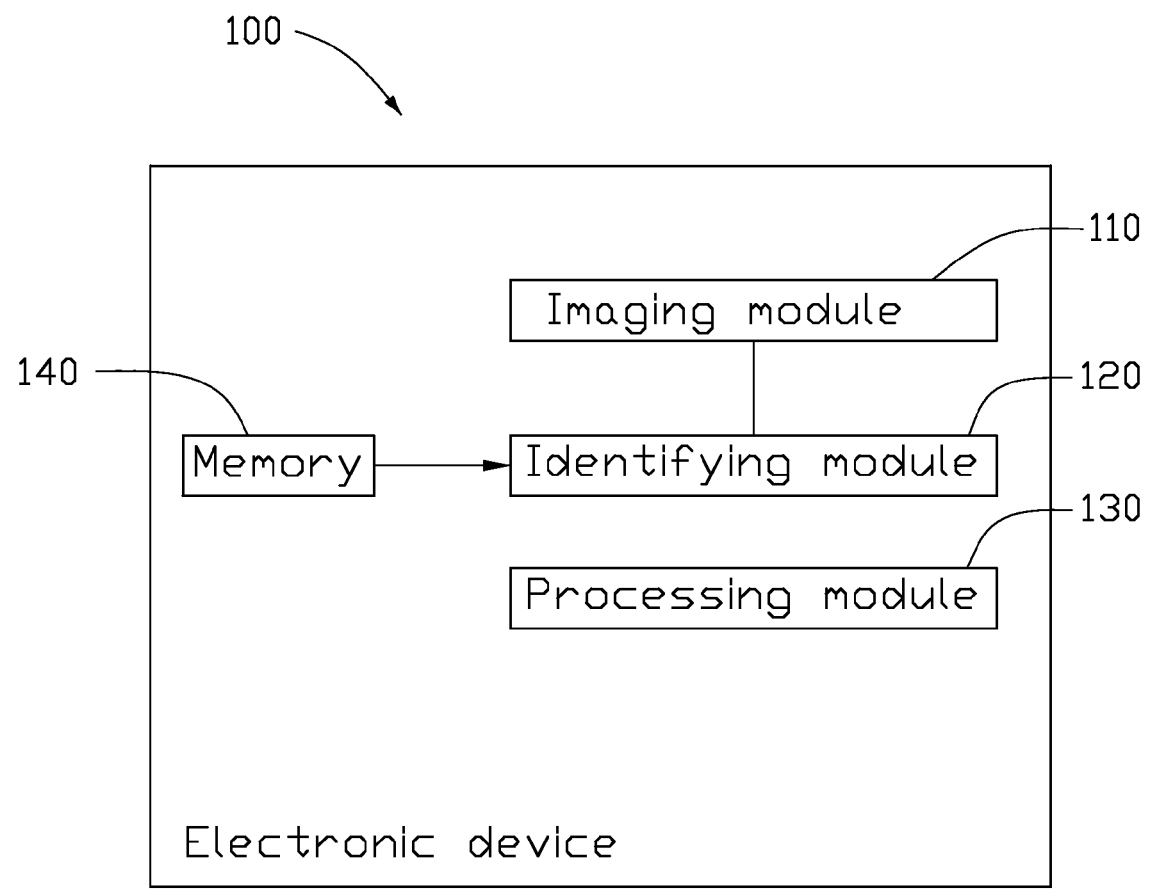
FIG. 1 is a functional diagram of an electronic device, according to an embodiment.

Referring to FIG. 1, an electronic device 100, according to an exemplary embodiment, includes an imaging module 110, an identifying module 120, a processing module 130, and a memory 140. The imaging module 110 is configured for capturing images of an object, which has different appearances viewed from different directions (shown in FIG. 3). The processing module 130 is configured for establishing new image-command associations. The memory 140 is configured for storing the established image-command associations. The identifying module 120 is configured for comparing a current image of the object captured from a specific direction with the stored image-command associations to find a match, and triggering a command execution of the matching image-command association by the electronic device (such as zoom in/zoom out). The identifying module 120 is also configured for instructing the processing module 130 to establish the new image-command association if no match is found.

In these embodiments, the electronic device 100 is a digital still camera, and the imaging module 110 is an arrangement of a pickup lens and an image sensor such as a CCD (Charge Coupled Device) image sensor, or a CMOS (Complementary Metal-Oxide-Semiconductor) image sensor thereof. Understandably, the electronic device 100 should be read broadly, and can be but is not limited to: a communication device such as a cellular phone, a computing device such as a PDA, a laptop computer, or a thin client, or a personal entertainment device such as a gaming device or a media player (e.g., DVD), and the imaging module 110 can also be a camera module. The memory 140 may be a RAM (random access memory).

Specifically, the identifying module 120 is configured for performing the comparison according to shape, color, and proportion of images of the stored image-command associations and the current captured image.

Figure 2:
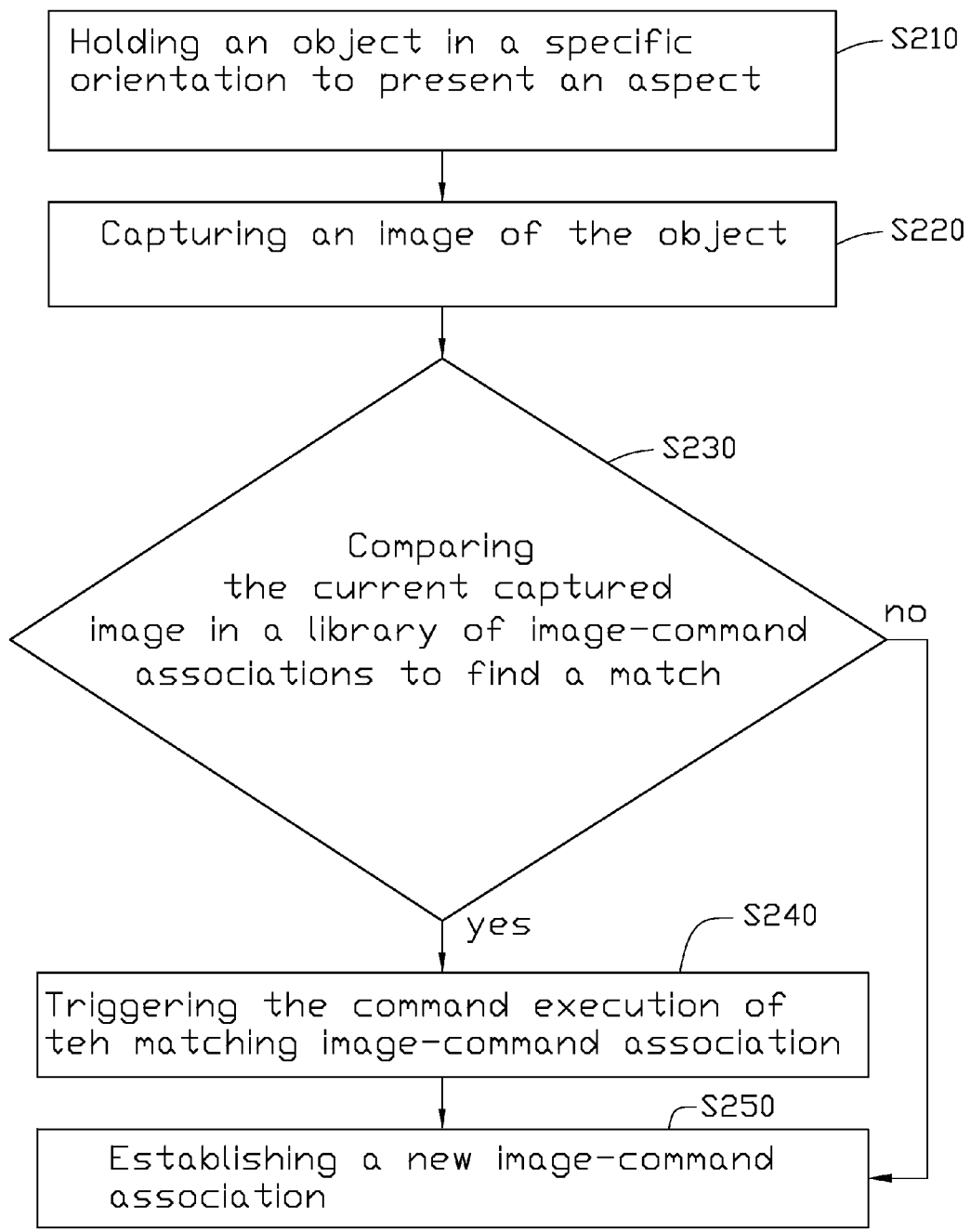
FIG. 2 is a flow chart of a method for controlling the electronic device, according to another embodiment.

Referring to FIG. 2, a method for controlling, for example, the electronic device 100, includes the following operations S210~250.

Figure 3:
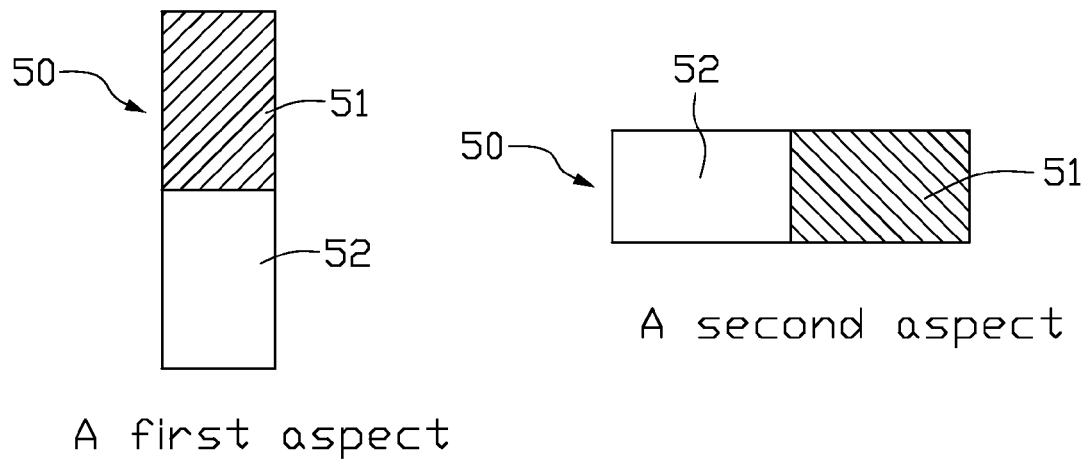
FIG. 3 is a schematic view showing three aspects captured from different directions, according to the embodiment.
Figure 3:
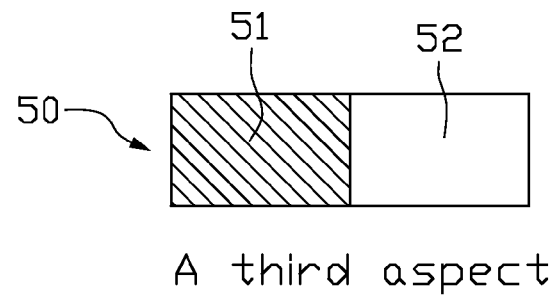

S210: holding an object in a specific orientation to present an aspect to the imaging module 110. Referring to FIG. 3, in this embodiment, the object is a stick 50 which has a black portion 51 and a white portion 52, three aspects of which are presented here as an example, for presentation to the imaging module 110.

S220: capturing an image of the object by the imaging module 110.

S230: comparing the current captured image with images in a library of image-command associations stored in the memory 140 by the identifying module 120 to find a match, if yes, going to S240, if no, jumping to S250. In detail, the identifying module 120 accesses the library stored in the memory 140 for comparison according to shape, color, and proportion between images of the image-command associations and the current captured image.

S240: triggering the command execution of the matching image-command association found in operation S230 by the electronic device 100. In this embodiment, for example, three image-command associations respectively corresponding to the three exemplary aspects of the object (see FIG. 3) comprise the library stored in the memory 140.

S250: instructing the processing module 130 to establish a new image-command association if no match is found in operation S230. This can be carried out by the identifying module 120. For example, if this happens, the processing module 130 is instructed to generate a warning message like 'no associated command! Please establish new on', and lists functions of the electronic device. Thereby the user can choose one to be associated with the current captured image of the object.

Therefore, the electronic device 100 and the method for controlling the electronic device 100 are advantageous for remotely controlling functions of the electronic device 100.

It will be understood that the above particular embodiments are described and shown in the drawings by way of illustration only. The principles and features of the present invention may be employed in various and numerous embodiments thereof without departing from the scope of the invention as claimed. The above-described embodiments illustrate the scope of the invention but do not restrict the scope of the invention.

What is claimed is:

1. A method for controlling an electronic device, comprising:
   holding an object in a specific orientation to present an aspect;
   capturing an image of the object;
   comparing the current captured image with images in a library of image-command associations to find a match; and
   when finding a match, triggering a command execution of the matching image-command association;
   wherein the comparing step further comprises establishing a new image-command association corresponding to the captured image when no match is found.

2. The method as claimed in claim 1, wherein the comparing step is according to shape, color, and proportion between images of the image-command associations and the current captured image.

3. The method as claimed in claim 1, wherein the comparing step further comprises accessing images in the library of the image-command associations from a memory.

4. The method as claimed in claim 1, wherein the image of the object is captured by an imaging module.

5. The method as claimed in claim 4, wherein the imaging module is an image sensor.

6. The method as claimed in claim 1, wherein the command execution of the image-command association is triggered by an identifying module.

7. An electronic device, comprising:
   an imaging module configured for capturing images of an object having different appearances viewed from different directions;
   an identifying module configured for comparing a current image of the object captured from a specific direction with the stored image-command associations to find a match;
   a processing module configured for establishing new image-command associations; and
   a memory configured for storing the image-command associations;
   wherein the identifying module triggers a command execution of the matching image-command association when finding a match, and instructing the processing module to establish the new image-command associations corresponding to the captured images when no match is found.

8. The electronic device as claimed in claim 7, wherein the imaging module is an image sensor.

9. The electronic device as claimed in claim 7, wherein the identifying module is further configured to generate a warning message and lists functions of the electronic device when no match is found, wherein the functions of the electronic device are listed for being chosen to establish the new image-command associations.

10. The electronic device as claimed in claim 9, wherein the library of image-command associations comprises a plurality of mage-command associations respectively corresponding to different aspects of the object.

11. The electronic device as claimed in claim 10, wherein each of the mage-command associations comprises a pre-stored image for being compared with the current captured image, and a command for performing the command execution.

12. The electronic device as claimed in claim 11, wherein the command execution comprises zooming in or zooming out.

13. The method as claimed in claim 1, further comprising: generating a warning message and listing functions of the electronic device when no match is found, wherein the functions of the electronic device are listed for being chosen to establish the new image-command association.

14. The method as claimed in claim 1, wherein the library of image-command associations comprises a plurality of mage-command associations respectively corresponding to different aspects of the object.

15. The method as claimed in claim 14, wherein each of the mage-command associations comprises a pre-stored image for being compared with the current captured image, and a command for performing the command execution.

16. The method as claimed in claim 15, wherein the command execution comprises zooming in or zooming out.

* * * * *